Feb. 18, 1936.  J. C. LESTER  2,031,170
VEHICLE INDICATING LAMP
Filed March 28, 1935
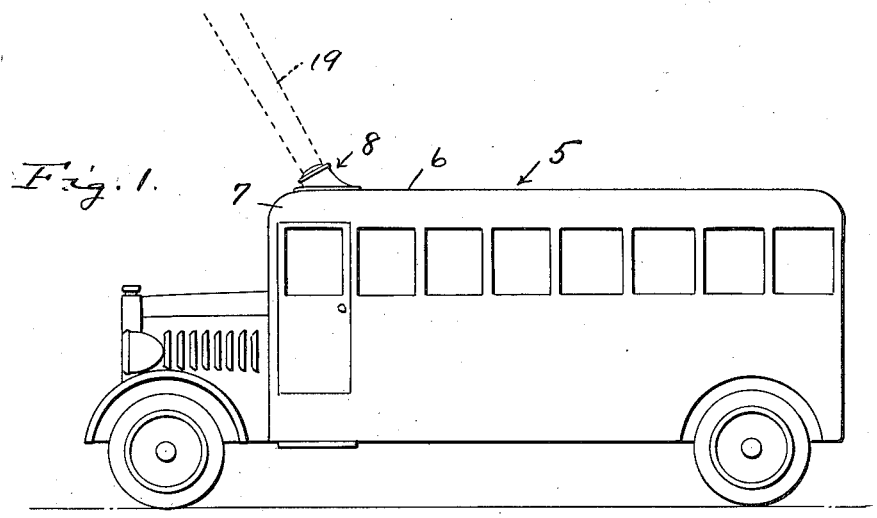
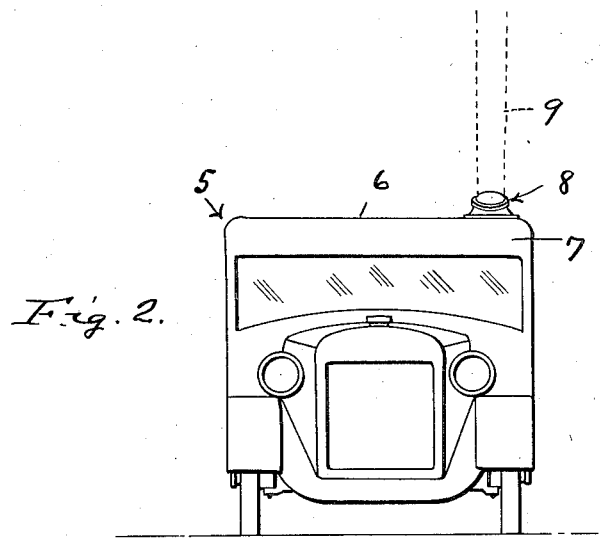
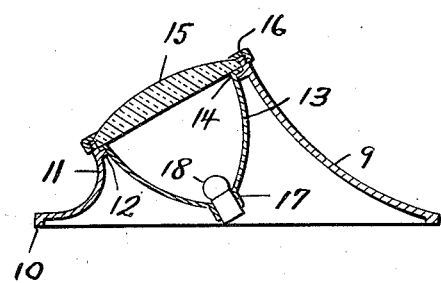
Inventor
J. C. Lester
By *Clarence A. O'Brien*
Attorney Patented Feb. 18, 1936

2,031,170

UNITED STATES PATENT OFFICE 2,031,170

VEHICLE INDICATING LAMP

James C. Lester, Pulaski, Tenn.

Application March 28, 1935, Serial No. 13,531

1 Claim. (Cl. 240—7.1)

My invention relates generally to automobiles and similar vehicles, and an important object of my invention is to provide an automobile which positively indicates, especially at night, the character of the vehicle and the direction in which the same is traveling.

Another important object of my invention is to provide a vehicle of the character indicated above which indicates at a distance the direction of travel thereof and the character of the vehicle itself, so that, in the case of passenger vehicles, such as buses and trains, prospective passengers may learn of the identity and direction of travel as well as the distance away of the vehicle, and thereby prepare themselves in advance to meet the vehicle or to permit the same to pass unhailed, as the case may be.

Another important object of my invention is to provide a vehicle of the character indicated above whereby the indications given by the vehicle may be seen and identified at relatively great distances, so as to give prospective passengers ample time in which to prepare for boarding the vehicle.

Another important object of my invention is to provide indicating means capable of being attached to vehicles of the character indicated as an accessory, or built in integrally with a vehicle at the factory.

Other objects and advantages of my invention will be apparent from a reading of the following description in connection with the drawing, wherein for purposes of illustration I have shown a preferred embodiment of my invention.

In the drawing:—

Figure 1 is a general side elevational view of a vehicle such as a bus embodying the present invention.

Figure 2 is an elevational view taken from the left in Figure 1 and looking toward the right.

Figure 3 is a longitudinal sectional view through the indicator lamp.

Referring in detail to the drawing, the numeral 5 generally designates a vehicle such as a passenger bus, freight truck, railroad car, or the like having the roof 6 and the driving compartment 7 at the left hand front part of the vehicle. Directly above the driving compartment there is installed on the roof 6 integrally therewith or attached by suitable means the indicator lamp which is generally designated by the numeral 8.

Although the indicator lamp may conceivably be made up of different structural features, it is essential that the lamp 8 present no great addition to the height of the top of the bus or the like, that the same direct a beam of light in a forward and upward angle, and that the beam of light be highly concentrated. A sufficiently concentrated light beam will act efficiently for the purposes of the invention if it has a forward and upward angulation of approximately 70 degrees with respect to the horizontal.

A suitable form of indicator lamp 8 is clearly shown in Figure 3 of the drawing, wherein it appears as composed of a hollow standard 9 of generally circular cross section. The lower end of the standard terminates in a relatively large rim 10 which rests upon the top of the bus or the like. From the rim the sides of the standard slope radially inwardly and upwardly in a manner to produce the forwardly and upwardly angulated neck portion 11 which terminates in a circular opening. Positioned slightly axially inwardly of the opening is the interior flange 12 with which the exterior of the open end of the reflector 13 is engaged. The end of the reflector has a flange 14 which rests on the axially outward side of the flange 12, and the axially outward side of the flange 14 is engaged by the inward side of the lens 15 which is seated within the end of the neck and held in place by a retaining flange 16 of L-shaped cross section which is threaded on the exterior of the neck 11.

The reflector 13 contains the bulb socket 17 in which is arranged the bulb 18. The longitudinal axis of the bulb 17 is aligned with the axis of the lens 15 at a forward and upward angulation of approximately 70 degrees with respect to the horizontal. The neck 11 is similarly angulated and concentric.

The lens 15 is flat on its axially inward side and convex on its upper side and so formed as to cause the bulb 18 to appear smaller than it actually is to an observer looking downwardly through the lens 15. This arrangement causes a high concentration of the rays issuing from the bulb 18, so as to produce a highly concentrated pencil or beam of indicating light to issue from the lamp as generally indicated by the numeral 19, in Figure 1. The reflector 13 is suitable in form and arrangement to enhance the brightness and concentration of the indicator beam as required.

The forward angulation of the beam of light unmistakably indicates at a distance, the direction in which the vehicle is traveling. The intensity of the indicating beam at a distance, clearly indicates not only the presence of the expected vehicle, but the direction in which the same is traveling. By having different colored bulbs or lenses, vehicles of different types may be clearly indicated at a distance, so that prospective passengers upon seeing a beam at a distance of a color other than the beam of a passenger bus or train, may postpone their arrangements for boarding the vehicle or upon discerning in the distance the beam of an approaching passenger vehicle may accelerate their preparations so as to meet the bus on time. The arrangement of the invention also increases the safety of night driving, since it indicates to following vehicles the presence ahead of a definitely defined type of vehicle, so that allowances may be made on that account, in any attempts to pass the vehicle so equipped. Approaching motorists are also warned of the type of vehicle coming down the road, so that provision may be made for safe driving under the circumstances, as on curves and hills where the headlights are still unseen.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A device of the class described comprising a lamp casing circular in cross section and having an opening at its upper end portion, the side portion of said casing flaring outwardly and downwardly and one side being shorter than the other side presenting the open top portion at an angle with respect to the vertical axis of the casing, an inwardly extending flange on the inner side of said casing spaced from the edge of the opening, a reflector in said casing disposed on said flange, the lower portion of said reflector lying in substantially the same plane as the bottom of said casing, a bulb in said reflector, a lens disposed within said opening, and a rim for securing said lens therein.

JAMES C. LESTER.